(12) United States Patent
Peng et al.

(10) Patent No.: US 8,737,882 B2
(45) Date of Patent: May 27, 2014

(54) DRIVING FORCE TRANSMISSION MECHANISM AND PROCESS CARTRIDGE CONTAINING THE SAME

(75) Inventors: Qingfei Peng, Guangdong (CN); Jun Liang, Guangdong (CN)

(73) Assignee: Zhuhai Seine Technology Limited, Zhuhai, Guangdong (CN)

(*) Notice: Subject to any disclaimer, the term of this patent is extended or adjusted under 35 U.S.C. 154(b) by 0 days.

(21) Appl. No.: 13/823,259

(22) PCT Filed: Sep. 27, 2011

(86) PCT No.: PCT/CN2011/080235
§ 371 (c)(1),
(2), (4) Date: Mar. 14, 2013

(87) PCT Pub. No.: WO2012/055312
PCT Pub. Date: May 3, 2012

(65) Prior Publication Data
US 2013/0216265 A1    Aug. 22, 2013

(30) Foreign Application Priority Data

Oct. 29, 2010 (CN) .......................... 2010 1 0537983
Jul. 5, 2011 (CN) .......................... 2011 1 0186826

(51) Int. Cl.
*G03G 15/00* (2006.01)
(52) U.S. Cl.
USPC .......................................... 399/167; 399/117
(58) Field of Classification Search
USPC .............................................. 399/117, 167
See application file for complete search history.

(56) References Cited

U.S. PATENT DOCUMENTS

| | | | | |
|---|---|---|---|---|
| 7,813,676 | B2 * | 10/2010 | Huck et al. | 399/167 |
| 2009/0010681 | A1 * | 1/2009 | Huck et al. | 399/167 |
| 2012/0051787 | A1 * | 3/2012 | Lui | 399/167 |

FOREIGN PATENT DOCUMENTS

| | | |
|---|---|---|
| CN | 1179559 A | 4/1998 |
| CN | 1188258 A | 7/1998 |
| CN | 201897693 U | 7/2011 |
| CN | 201945801 U | 8/2011 |
| JP | 2002-40875 | 2/2002 |

* cited by examiner

*Primary Examiner* — Ryan Walsh
(74) *Attorney, Agent, or Firm* — Jackson IPG PLLC

(57) ABSTRACT

A driving force transmission mechanism comprising a photosensitive drum driving member, wherein the photosensitive drum driving member is engaged with an image forming apparatus driving member and receives the driving force from the image forming apparatus driving member; the image forming apparatus driving member comprises a triangular groove having a triangular cross-section and driving force transmission portion disposed in three vertex angles of the triangular groove; the photosensitive drum driving member comprises a non-distorting protrusion which is axially extended from the end face of a drum shaft and engaged with the groove on the image forming apparatus driving member; the protrusion has a position-limiting mechanism and a stressed mechanism; a projecting tooth obliquely disposed on said non-distorting protrusion is taken as the stressed mechanism; and each projecting tooth also has a mating surface which is engaged with the driving force transmission component to transmit the driving force.

2 Claims, 16 Drawing Sheets

DRIVING FORCE TRANSMISSION MECHANISM AND PROCESS CARTRIDGE CONTAINING THE SAME

FIELD OF THE INVENTION

The invention relates to an image forming apparatus such as a laser printer and a duplicating machine, in particular to a driving force transmission mechanism applied to the image forming apparatus and a process cartridge using the same.

BACKGROUND OF THE INVENTION

The traditional image forming apparatus is provided with a motor, an image forming apparatus driving member and a process cartridge, wherein the process cartridge is detachably mountable to the image forming apparatus; and a photosensitive drum is arranged on the process cartridge. During the operation of the image forming apparatus, the driving force is generated by the motor and transmitted to the process cartridge via the image forming apparatus driving member, so that the photosensitive drum on the process cartridge is driven to rotate.

As illustrated in FIGS. 1 and 2, a driving force transmission mechanism is fixedly disposed at one end of the photosensitive drum 7 and comprises a drum shaft 17; a distorting protrusion 17a is disposed on the drum shaft 17 and has an end portion 17a1; the rotation center of the drum shaft 17 is coincident with the rotation center of the photosensitive drum 7; and the image forming apparatus driving member 18 is provided with a distorting groove 18a which has an bottom surface 18a2.

During the operation of the image forming apparatus, the image forming apparatus driving member 18 receives the rotating driving force from the motor; the drum shaft 17 is engaged with the image forming apparatus driving member 18; and the rotating driving force is transmitted to the drum shaft 17 via the image forming apparatus driving member 18 and finally drives the photosensitive drum 7 to rotate. When the drum shaft 17 is engaged with the image forming apparatus driving member 18, the distorting protrusion 17a on the drum shaft 17 is interposed into the distorting groove 18a on the image forming apparatus driving member 18; the end portion 17a1 is over against the bottom surface 18a2; and the rotating driving force from the image forming apparatus driving member 18 is transmitted to the drum shaft 17 via the engagement between the distorting protrusion 17a and the groove 18a.

FIGS. 3 and 4 are cross-section diagrams respectively illustrating the state when the distorting protrusion 17a and the distorting groove 18a do not rotate and rotate. As illustrated in the figures, cross-sections of the distorting protrusion 17a and the distorting groove 18a are both triangles (such as equilateral triangles), and the dimension of the triangular protrusion 17a is less than that of the triangular groove 18a. As illustrated in FIG. 3, when the protrusion 17a is interposed into the groove 18a and does not rotate along with the groove 18a, a rotational axis X1 of the drum shaft on the photosensitive drum is not coincident with a rotational axis X2 of the image forming apparatus driving member. As illustrated in FIG. 4, when the protrusion 17a is engaged with the groove 18a and rotates along with the groove 18a, three vertex angles 17a2 of the triangular protrusion 17a are engaged with three edges of the triangle of the groove 18a, and the driving force is transmitted to the protrusion 17a from the groove 18a. Herein, the rotational axis X1 of the drum shaft on the photosensitive drum is coincident with the rotational axis X2 of the image forming apparatus driving member, so that stable transmission between the distorting protrusion 17a and the distorting groove 18a during the operation can be guaranteed. In the figure, RO refers to the rotating circle diameter of the three vertex angles 17a2 of the protrusion 17a; R1 refers to the inscribed circle diameter of the triangular groove 18a; and R2 refers to the rotating circle diameter of three vertex angles of the groove 18a. In order to achieve the driving force transmission between the protrusion 17a and the image forming apparatus driving member 18a, the RO, the R1 and the R2 must meet the following condition: R1<R0<R2.

FIG. 5 is another embodiment of the prior art. In the embodiment, both the distorting protrusion 17a and the distorting groove 18a are quadrangles (such as regular quadrangles), and the quadrilateral protrusion 17a and the quadrilateral groove 18a are engaged with each other and used for driving force transmission.

The image forming apparatus driving member in the prior art can also adopt the means as illustrated in FIG. 6. As illustrated in FIG. 6, a distorting groove 28a is disposed at one end of the image forming apparatus driving member 28 and provided with a bottom surface 28a1 and a supporting protrusion 28a2 which is disposed at the center of the triangular distorting groove 28a (the rotation center of the supporting column protrusion 28a2 is coincident with a rotational axis X2 of the image forming apparatus driving member); the height of the supporting protrusion 28a2 is basically the same with the depth of the groove 28a; and said supporting column can be conical.

The photosensitive drum provided with the driving force transmission mechanism is generally applied to a process cartridge for the traditional image forming apparatus. Said process cartridge at least comprises the photosensitive drum which is used for forming an electrostatic latent image and provided with the driving force transmission mechanism, a developer which is used for developing the electrostatic latent image, and a developing roller which is used for transmitting the developer to the photosensitive drum. When said process cartridge is mounted on the image forming apparatus, the rotating driving force from the motor on the image forming apparatus is received by said image forming apparatus driving member, so that the photosensitive drum and the developing roller are driven to rotate.

The driving force transmission mechanism in the prior art has the disadvantages that:

1. When the distorting protrusion is engaged with the distorting groove, the distorting angle of distorting surfaces on the protrusion and the groove is required to have high precision. When the distorting angle is inconsistent due to the manufacturing precision of the distorting surfaces on the protrusion and the groove, the distorting surfaces on the protrusion and the groove make point-to-surface contact, and one distorting surface may be deformed during the engagement between the protrusion and the groove, so that the rotation axis X1 of the drum shaft on the photosensitive drum cannot be coincident with the rotational axis X2 of the image forming apparatus driving member, and thus stable driving force transmission can be affected. In order to solve said problem, the manufacturing precision of the distorting surfaces of the protrusion and the groove is required to be high, so that the manufacturing cost can be increased and the problems such as difficult manufacture can be caused.

2. Polygonal shapes of the protrusion and the groove are difficult to process, and the manufacturing precision of the protrusion and the groove is required to be high. With an equilateral triangle as an example, the precision of the equilateral triangle protrusion and the equilateral triangle groove is required to be high, so that the precision at the triangular center can be guaranteed. Or else, the rotational axis X1 of the drum shaft on the photosensitive drum may not be coincident with the rotational axis X2 of the image forming apparatus driving member during the engagement between the protrusion and the groove, and then instable transmission can be caused. In addition, during the engagement between the protrusion and the groove, vertex angles of the triangle on the protrusion tend to be deformed after being stressed due to the requirement of driving force transmission and tend to be worn or damaged after long-term operation. Moreover, as the three vertex angles of the triangle also have the functions of stress rotation and supporting and positioning during the operation, the phenomenon that the centers X1 and X2 are not coincident with each other tends to occur during the engagement between the worn or damaged triangle and the groove, and thus stable transmission can be affected. Therefore, in order to guarantee the transmission precision and stableness, the hardness and wear resistance of materials of the triangular protrusion are required to be high. Meanwhile, as the positions at which the edges of the triangular groove make contact with the three vertex angles of the protrusion also tend to be damaged or worn during the operation, the hardness and wear resistance of the triangular groove are also required to be high.

SUMMARY OF THE INVENTION

The invention provides a driving force transmission mechanism to solve the technical problem that the engagement between a protrusion and a groove may be affected by the fact that a stressed mechanism may be worn due to overlarge pressure during the engagement between the stressed mechanism and the groove.

In order to solve the problem, the invention adopts the technical solution that:

The invention relates to a driving force transmission mechanism, which comprises a photosensitive drum driving member, wherein the photosensitive drum driving member is engaged with an image forming apparatus driving member to transmit the driving force; the image forming apparatus comprises a triangular groove having a triangular cross-section and driving force transmission portion disposed in three vertex angles of the triangular groove; the photosensitive drum driving member comprises a non-distorting protrusion axially extended from the end face of a drum shaft and engaged with the groove on the image forming apparatus driving member; the protrusion has a position-limiting mechanism and a stressed mechanism; a projecting tooth obliquely disposed on the non-distorting protrusion is taken as the stressed mechanism; and each said projecting tooth also has a mating surface which is engaged with the driving force transmission portion to transmit the driving force.

The position-limiting mechanism and the stressed mechanism are disposed at different positions.

A supporting disc disposed on the protrusion and engaged with edges of the groove is taken as the position-limiting mechanism.

The number of the projecting teeth is two; and the two projecting teeth are respectively engaged with two of the driving force transmission portion disposed in the three vertex angles of said groove.

The included angle between said projecting teeth and a rotational axis of the photosensitive drum driving member is 3°-40°.

The included angle between the oblique projecting tooth and the rotational axis of the photosensitive drum driving member is 25°-30°.

The supporting disc is disposed on the protrusion; and the length of each projecting tooth beginning from the supporting disc of the non-distorting protrusion along the radial direction is 2-5 mm.

The length of each projecting tooth beginning from the supporting disc of the non-distorting protrusion along the radial direction is 2.3-3.3 mm.

The minimum included angle between the two projecting teeth is 120°; and the manufacturing precision upper limit tolerance of the included angle is 2°-10°.

The manufacturing precision upper limit tolerance of the included angle is 2°-4°.

Each projecting tooth also has two parallel planes which are connected with the supporting disc; and the mating surface is at an included angle with the two parallel planes.

The included angle between bevel edges of the mating surfaces and a photosensitive drum axis is 5°-50°.

The included angle between the bevel edges of the mating surfaces and the photosensitive drum axis is 10°-40°.

Each mating surface has two straight edges; and the included angle between the straight edge and a connecting line from the center of the photosensitive drum driving member to a vertex angle of each projecting tooth is 0°-90°.

The included angle between the straight edge and the connecting line from the center of the photosensitive drum driving member to the vertex angle of each projecting tooth is 25°-45°.

The area of the mating surface is 5-20 mm$^2$.

The area of the mating surface is 7-16 mm$^2$.

The position-limiting mechanism has a supporting hole which is disposed on the protrusion and at a central axis of the drum shaft and a supporting protrusion which is disposed at a central axis in the groove and engaged with the limiting hole.

The supporting disc and two protruding columns are disposed on the protrusion; the protruding columns are symmetrically distributed on both sides of the protrusion; a first protruding column is a projecting tooth engaged with the driving force transmission component; a second protruding column makes contact with the inner wall of the groove; the first protruding column is taken as the stressed mechanism; and the position-limiting mechanism comprises the supporting disc and the second protruding column.

The invention relates to a process cartridge, which comprises a photosensitive drum and also comprises the driving force transmission mechanism which is disposed on the end of the photosensitive drum.

By adoption of the technical solution, as the position-limiting mechanism and the stressed mechanism are disposed at different positions, the position-limiting mechanism cannot affect the coincidence of rotation centers during the engagement due to overlarge pressure of the stressed mechanism when being engaged with the groove, and thus the technical problem in the traditional driving force transmission mechanism that the engagement between the protrusion and the groove may be affected by the fact that the stressed mechanism may be worn due to overlarge pressure when being engaged with the groove can be solved. Moreover, as the number of the projecting teeth is two and the two projecting teeth are respectively engaged with two of the driving force transmission portion of the three vertex angles, the acting force of the image forming apparatus driving member and the photosensitive drum driving member at various positioning points can be reduced, and thus the wear of the image forming apparatus driving member and the photosensitive drum driving member can be reduced, and consequently, the technical problem that the positioning may be affected by the fact that axis centers of the image forming apparatus driving member and the photosensitive drum driving member are not coincident with each other due to wear can be solved.

The technical solution also has the advantages that:

1. The protrusions with the same structure can be engaged with the grooves with different shapes, so as to achieve driving force transmission.

2. By adoption of the above shapes, the protrusions are easier to process and the manufacturing precision requirement is lower.

3. Supporting points and stress points on the protrusion are separate from each other, so that the supporting points on the protrusion cannot affect the coincidence of the rotation centers X1 and X2 during the engagement due to overlarge pressure of the stress points on the protrusion when being engaged with the groove.

4. The protrusion and the groove can be conical, so that the protrusion can be interposed into the groove more easily.

5. As the projecting tooth on the protrusion is obliquely disposed on the supporting disc, the phenomenon that the photosensitive drum driving member is disengaged from the image forming apparatus driving member during the driving force transmission can be avoided, and thus stable driving force transmission between the image forming apparatus driving member and the photosensitive drum driving member can be realized.

6. A plurality of oblique projecting teeth can also be disposed on the protrusion, so that the number of stress points between the protrusion and the groove can be reduced.

7. By arrangement of the mating surfaces on the projecting teeth, the stressed area between the protrusion and the groove can be increased, and thus the wear produced between the protrusion and the groove can be reduced, and consequently, more stable driving force transmission between the photosensitive drum driving member and the image forming apparatus driving member can be realized.

DETAILED DESCRIPTION OF THE PREFERRED EMBODIMENTS

Embodiment 1

The invention relates to a driving force transmission mechanism, which comprises a photosensitive drum driving member, wherein the photosensitive drum driving member is engaged with an image forming apparatus driving member and receives the driving force from the image forming apparatus driving member; a groove is disposed on the image forming apparatus driving member; the photosensitive drum driving member comprises a protrusion which is axially extended from the end face of a photosensitive drum shaft; and the limiting between the protrusion and the groove can be realized via a mutual contact position-limiting mechanism, and the driving force transmission can be realized via a stressed mechanism.

Figure 1:
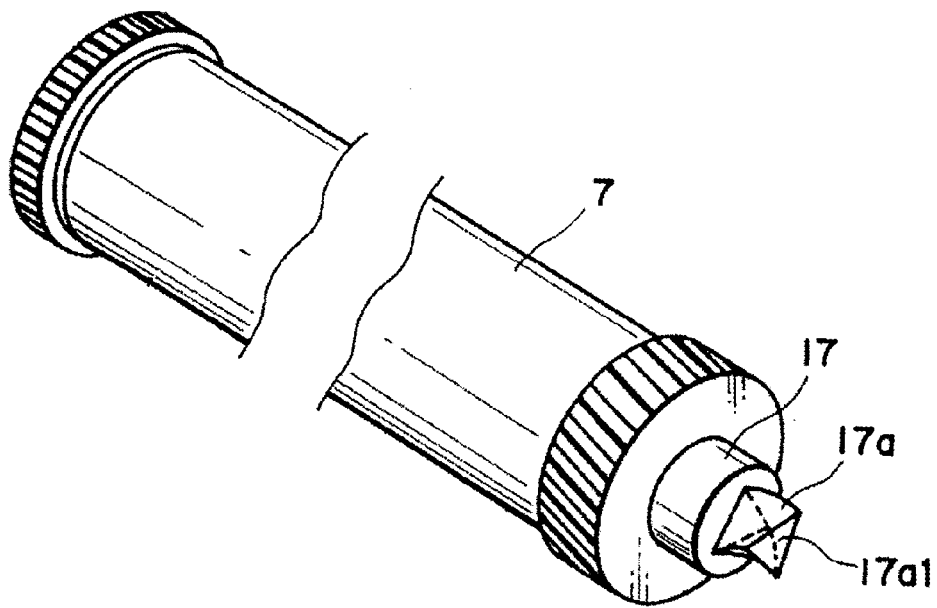
FIG. 1 is a stereogram of a photosensitive drum provided with a photosensitive drum driving member in the prior art.
Figure 2:
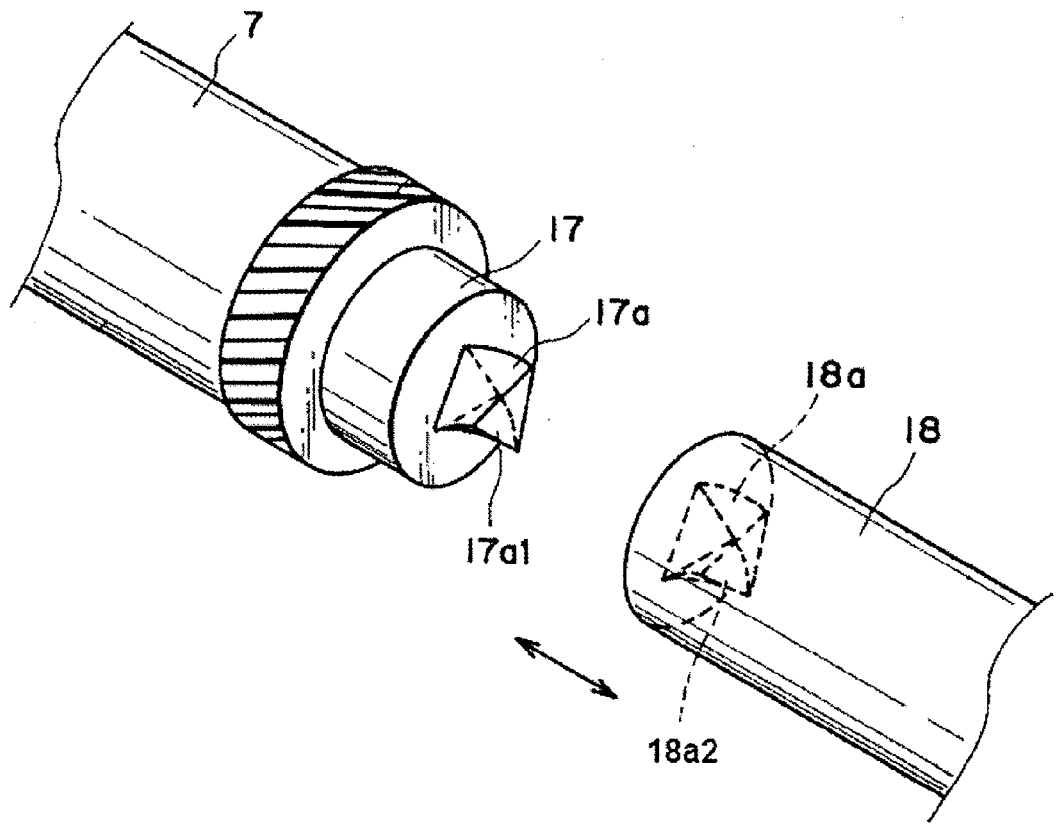
FIG. 2 is a stereogram of the photosensitive drum driving member and an image forming apparatus driving member in the prior art.
Figure 3:
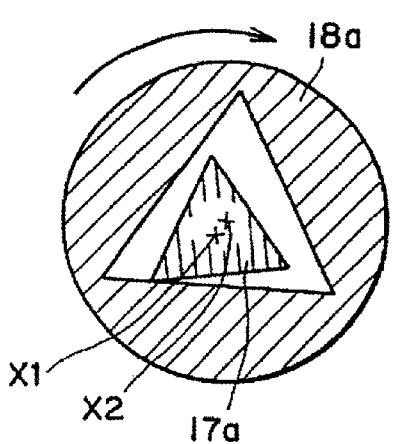
FIG. 3 is a cross-section diagram illustrating the state when a distorting protrusion and a distorting groove in the prior art do not rotate.
Figure 4:
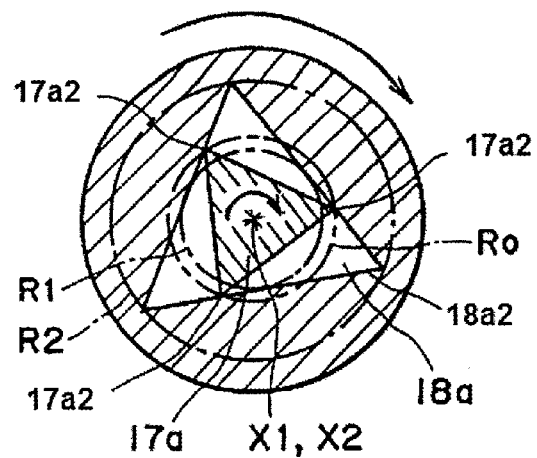
FIG. 4 is a cross-section diagram illustrating the state when the distorting protrusion and the distorting groove in the prior art rotate.
Figure 5:
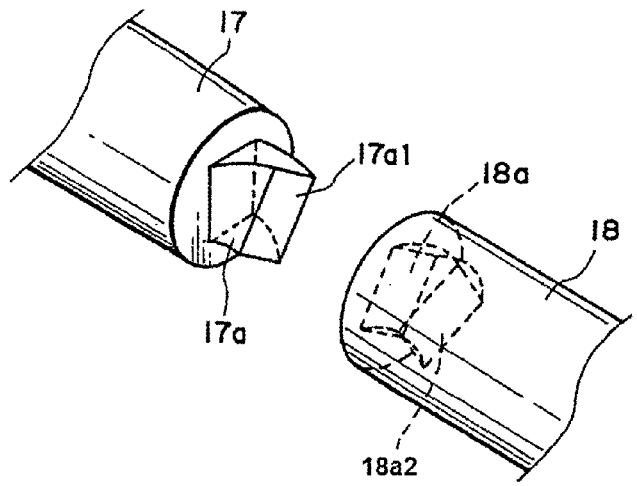
FIG. 5 is a schematic diagram illustrating the state when another protrusion and another groove in the prior art are quadrilateral in shape.
Figure 6:
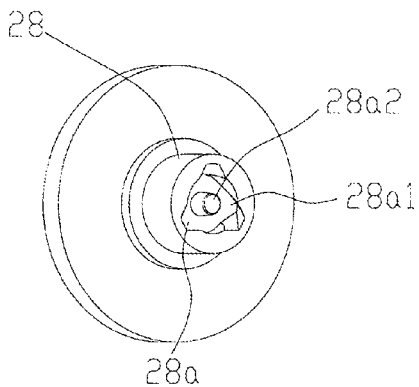
FIG. 6 is a schematic diagram illustrating the state when a positioning column is disposed at the center of the groove in the prior art.
Figure 6:
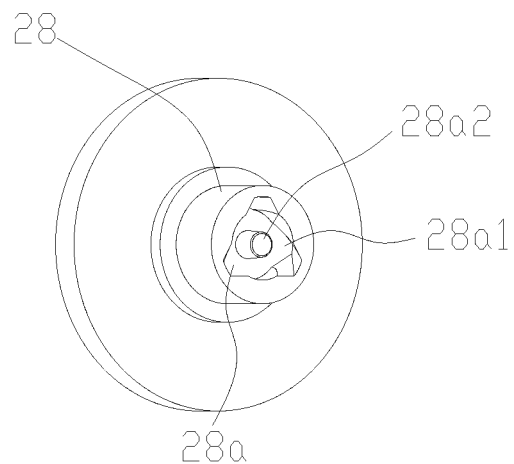
Figure 7:
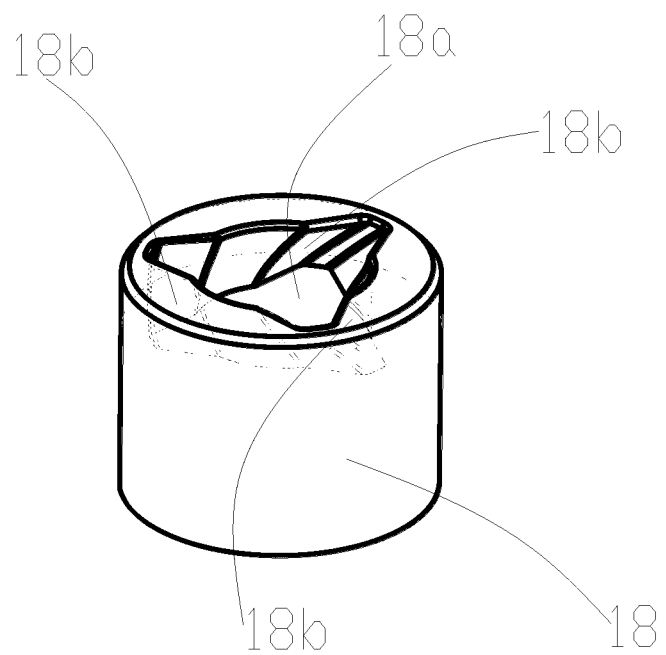
FIG. 7 is a stereogram of the image forming apparatus driving member.
Figure 8:
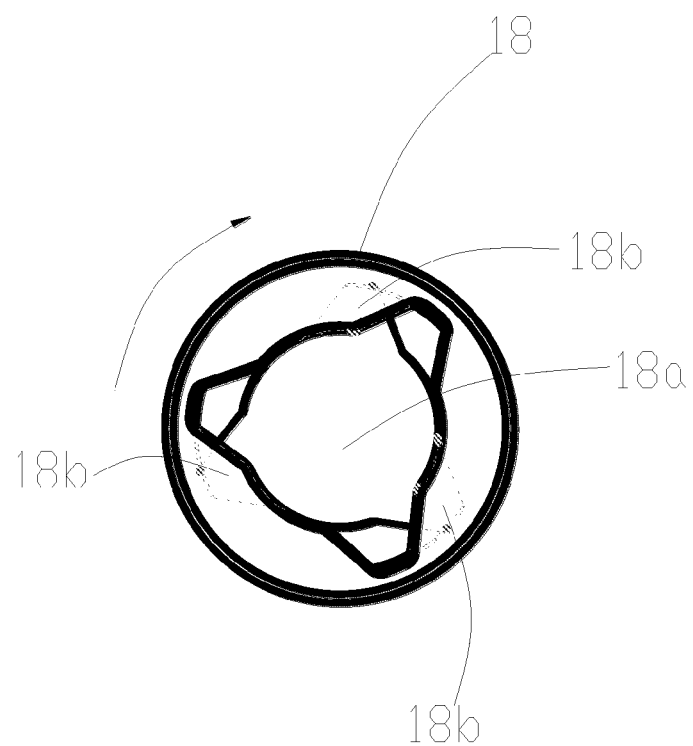
FIG. 8 is a top view of the image forming apparatus driving member.

FIGS. 7 and 8 are respectively a stereogram and a top view of the image forming apparatus driving member. As illustrated in the figures, the image forming apparatus driving member 18 comprises a distorting groove 18a having a triangular cross-section and driving force transmission portion 18b disposed at three vertex angles of the triangle, and the driving force transmission portion 18b are inner bevels disposed in the vertex angles of the triangle and on the downstream of the rotation direction of the image forming apparatus driving member.

Figure 9:
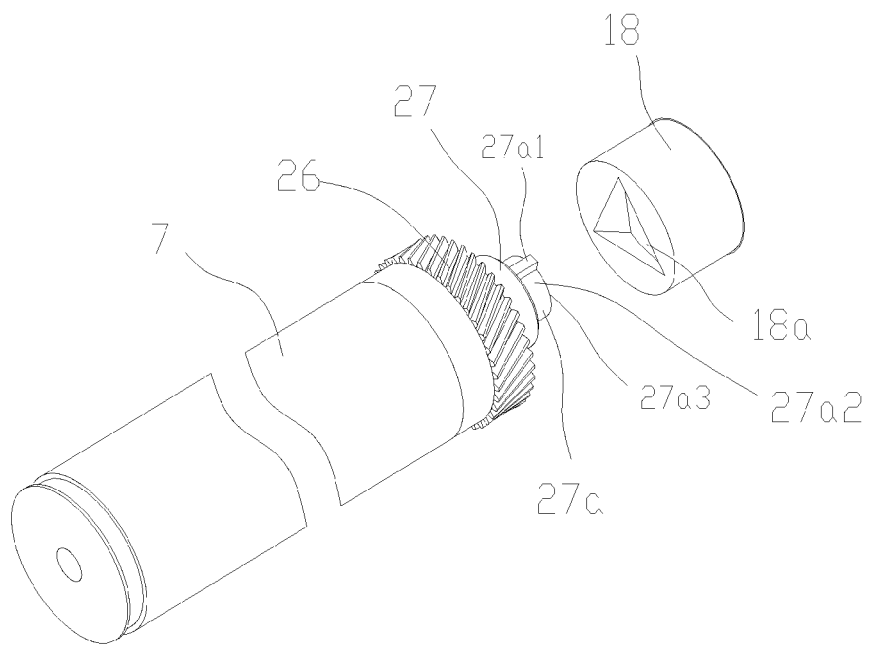
FIG. 9 is a stereogram illustrating the state before the engagement between a photosensitive drum driving member and an image forming apparatus driving member in the embodiment 1.

FIG. 9 is a stereogram illustrating the state before the engagement of the photosensitive drum driving member and the image forming apparatus driving member. As illustrated in the figure, the photosensitive drum driving member comprises a drum flange 26 disposed on the end of a photosensitive drum 7, and a drum shaft 27 and a non-distorting protrusion 27a which are axially extended from the end portion of the drum flange 26 and used for rotationally supporting the photosensitive drum 7 during the operation of a process cartridge, wherein a supporting disc 27a2 and a projecting tooth 27a1 are disposed on the non-distorting protrusion 27a. In the embodiment, the supporting disc 27a2 and the projecting tooth 27a1 are respectively taken as the position-limiting mechanism and the stressed mechanism of the driving force transmission mechanism. The non-distorting protrusion 27a can be engaged with the distorting groove 18a. When the projecting tooth 27a1 and the supporting disc 27a2 on the protrusion 27a are interposed into the groove 18a, the protrusion 27a is engaged with the groove 18a and receives the rotating driving force from the groove 18a. Therefore, when a motor on an image forming apparatus rotates, the driving force is transmitted to the image forming apparatus driving member 18 via the motor and to the photosensitive drum driving member via the engagement between the non-distorting protrusion 27a and the distorting groove 18a, and finally the photosensitive drum 7 is driven to rotate. The cross-section of the distorting groove 18a is a triangle (such as an equilateral triangle).

Figure 10A:
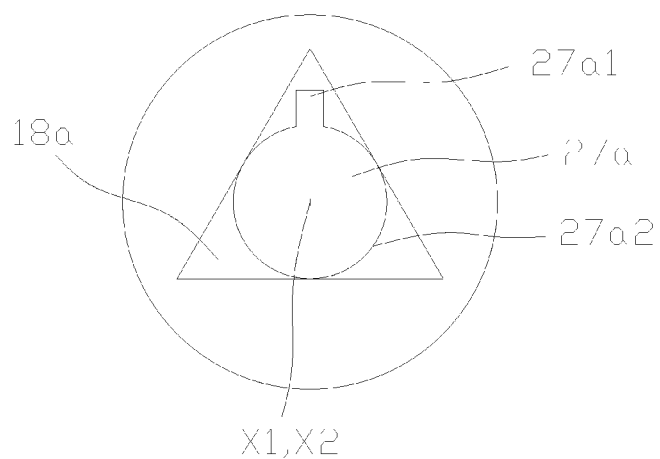
FIGS. 10a and 10b are cross-section diagrams illustrating the state when a non-distorting protrusion and a distorting groove in the embodiment 1 are engaged with each other.

FIG. 10a is a cross-section diagram illustrating the state when the non-distorting protrusion 27a is engaged with the distorting groove 18a. As illustrated in the figure, when the non-distorting protrusion 27a is engaged with the distorting groove 18a, the supporting disc 27a2 on the non-distorting protrusion 27a is tangent to three edges of the groove 18a, so that accurate centering of the protrusion 27a and the groove 18a can be guaranteed. Herein, a rotational axis X1 of the non-distorting protrusion 27a is coincident with a rotational axis X2 of the distorting groove 18a, so that stable engagement between the non-distorting protrusion 27a and the distorting groove 18a can be guaranteed.

During the engagement between the non-distorting protrusion 27a and the distorting groove 18a, the projecting tooth 27a1 on the non-distorting protrusion 27a is engaged with the driving force transmission portion 18b to receive the rotating driving force, so that the protrusion 27a is driven to rotate along with the groove 18a.

During the engagement between the projecting tooth 27a1 and the driving force transmission portion 18b, the projecting tooth 27a1 tends to be deformed due to the pressure of the groove 18a. As the projecting tooth 27a1 used for transmitting the rotating driving force and the supporting disc 27a2 used for accurately positioning the protrusion 27a are separately disposed, the phenomenon that the supporting disc 27a2 may be affected by the projecting tooth 27a1 during the rotation of the non-distorting protrusion 27a can be avoided, and thus more accurate positioning of the protrusion 27a can be realized, and consequently, instable operation of the non-distorting protrusion 27a when being engaged with the distorting groove 18a can be avoided.

Figure 10B:
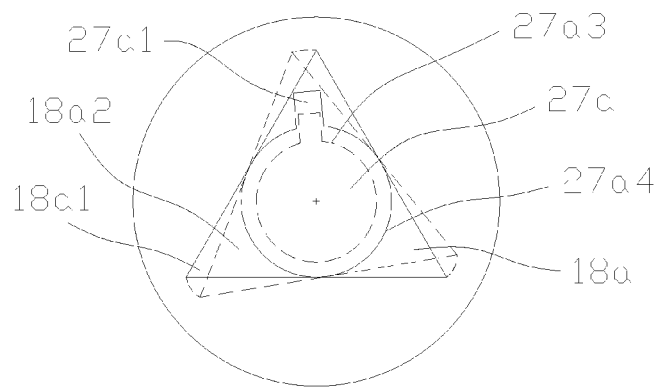

For the protrusion 27a to be more easily interposed into the groove 18a, the projecting tooth 27a1 and the supporting disc 27a2 on the protrusion 27a can be conical. As illustrated in FIG. 10b, a protrusion top surface 27a3 (as shown by the dashed line in the figure) is a plane, at a position which is the farthest away from the center of the photosensitive drum, on the drum shaft 27 (i.e., when the protrusion 27a is interposed into the groove 18a, the top surface 27a3 is the first to go into the groove 18a), and a protrusion mating surface 27a4 (as shown by the solid line in the figure) is a cross-section, which is tangent to three edges of the groove 18a, on the protrusion 27a. As illustrated in the figure, the dimension of the top surface 27a3 is less than that of the mating surface 27a4. Therefore, when the non-distorting protrusion 27a is engaged with the distorting groove 18a, the top surface 27a3 can be more easily interposed into the groove 18a. As the protrusion 27a is conical, after the top surface 27a3 is interposed into the groove 18a, other cross-sections of the protrusion 27a go deep into the groove 18a until the mating surface 27a4 is tangent to the groove 18a. Herein, the rotational axis X1 of the non-distorting protrusion 27a and the rotational axis X2 of the distorting groove 18a are coincident with each other.

As illustrated in FIG. 10b, as the groove 18a is distorted, a groove top surface 18a1 (as shown by the solid line in the figure) is not coincident with a groove bottom surface 18a2 (as shown by the dashed line in the figure). In order to guarantee large depth of the non-distorting protrusion 27a into the distorting groove 18a, the width of the projecting tooth 27a1 on the protrusion 27a must be set to be within certain range. For the non-distorting protrusion 27a to go deep into the distorting groove 18a, the width of the projecting tooth 28a1 must be less than or equal to the width of an overlap area of the groove top surface 18a1 and the groove bottom surface 18a2, and thus the projecting tooth 27a1 can be more easily interposed into the groove 18a and maximum mating area of the projecting tooth 27a1 and the groove 18a can be achieved. As the width of the projecting tooth 28a1 is less than that of the groove top surface 18a1, the projecting tooth 27a1 can be more conveniently engaged with the groove top surface 18a1, and thus the projecting tooth 27a1 can be more easily interposed into the groove 18a.

The supporting disc in the embodiment adopts a circular structure. It is apparent to those skilled in the art that the disc with the circular structure can be more easily manufactured and the manufacturing precision requirement can be more easily met. After the circular disc is manufactured via machining tools such as a turning machine, a key way is disposed on the circular disc via tools such as a milling machine and general flat keys or woodruff keys and the like meeting the dimension requirement are disposed into the key way, and then the protrusion in the embodiment can be manufactured.

Embodiment 2

Figure 11:
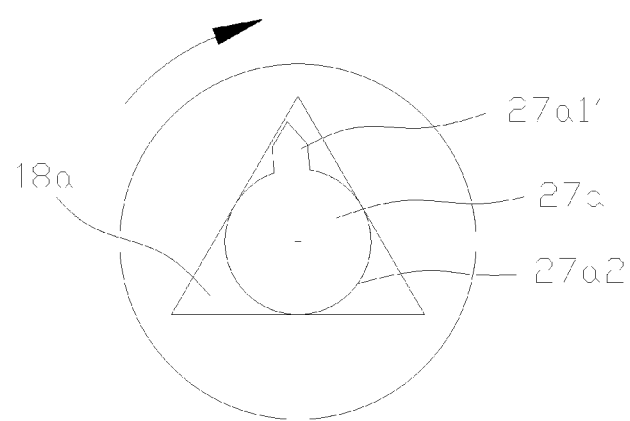
FIG. 11 is a cross-section diagram illustrating the state when a protrusion and a groove in the embodiment 2 are engaged with each other.

As illustrated in FIG. 11, in order to increase the contact area of a projecting tooth 27a1' and a groove 18a and decrease the phenomenon that the projecting tooth 27a1' is deformed due to overlarge partial pressure, the section, which makes contact with an edge of the groove 18a, on the projecting tooth 27a1' is set to be a bevel, and the obliqueness of the bevel is basically the same with that of the edge of the groove.

Embodiment 3

Figure 12A:
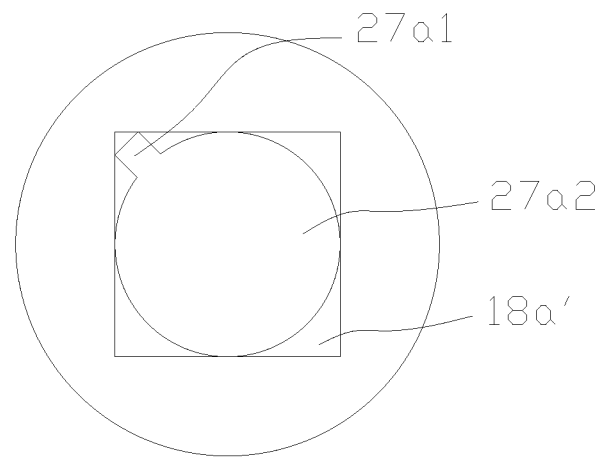
FIGS. 12a and 12b are cross-section diagrams respectively illustrating the state when a non-distorting protrusion and a distorting groove in the embodiment 3 are engaged with each other in the case that the groove is a quadrangle and a pentagon.

As illustrated in FIG. 12a, a groove 18a' is a regular quadrangle and a supporting disc 27a2 is engaged with four edges of the groove 18a', so that centers of a protrusion 27a and the groove 18a' can be guaranteed to be coincident with each other. Moreover, a projecting tooth 27a1 is engaged with one edge of the groove in the groove 18a', and the driving force is transmitted via the groove 18a'.

Figure 12B:
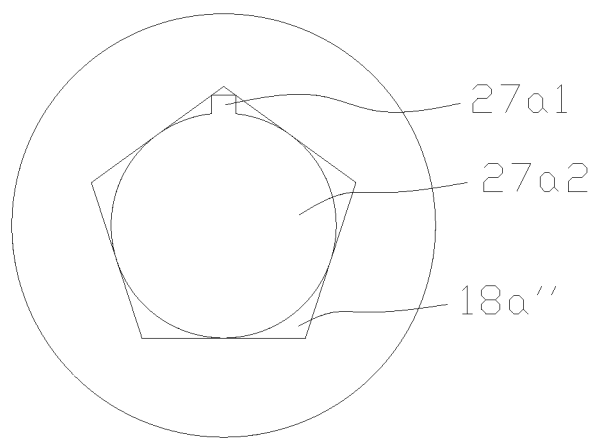

As illustrated in FIG. 12b, a groove 18a" is a regular pentagon and the supporting disc 27a2 is engaged with five edges of the groove 18a". Moreover, the projecting tooth 27a1 is engaged with one edge of the groove in the groove 18a", and the driving force is transmitted via the groove 18a".

It can be seen from the above that protrusions with the same structure can be applied to the grooves with different shapes.

Embodiment 4

Figure 13A:
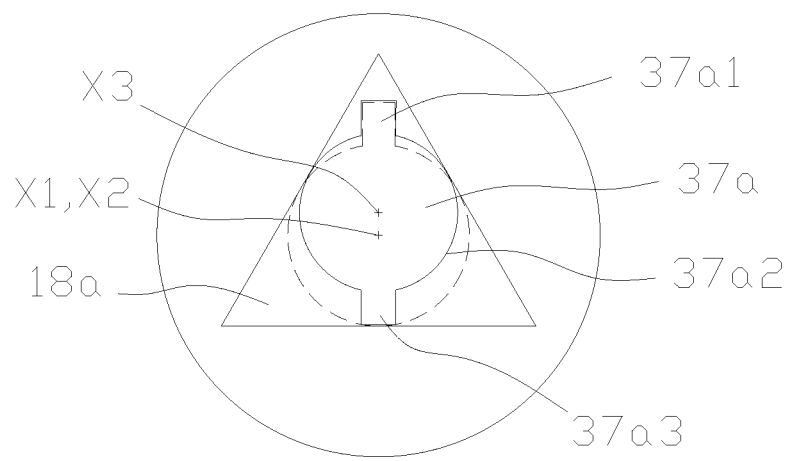
FIGS. 13a and 13b are cross-section diagrams illustrating the state when a non-distorting protrusion provided with a supporting column and a distorting groove in the embodiment 4 are engaged with each other.
Figure 13B:
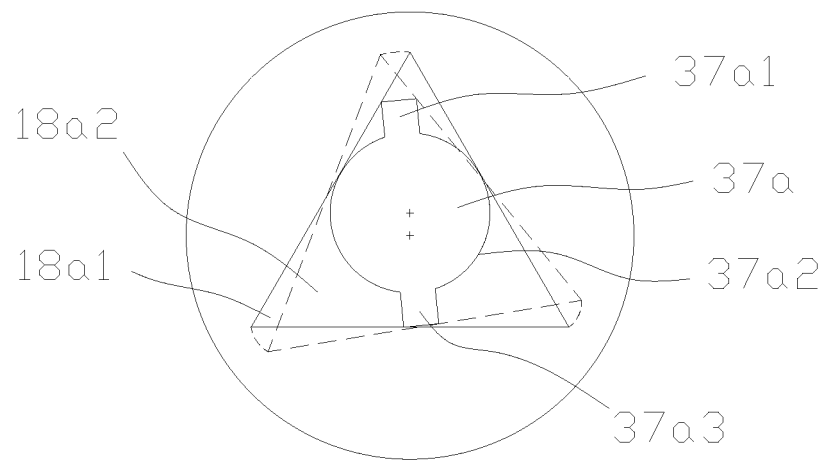

As illustrated in FIGS. 13a and 13b, compared with the embodiment 1, a non-distorting protrusion 37a (as shown by the solid line in the figure) is varied in shape compared with the protrusion 27a (as shown by the dashed line in the figure) in the embodiment 1.

FIG. 13a is a cross-section diagram illustrating the state when the non-distorting protrusion 37a is engaged with a distorting groove 18a. The non-distorting protrusion 37a comprises two protruding columns and a supporting disc 37a2, wherein a first protruding column is a projecting tooth 37a1 and a second protruding column is a supporting column 37a3. In the embodiment, the supporting disc 37a2 and the supporting column 37a3 are taken as the position-limiting mechanism of the driving force transmission mechanism. When the non-distorting protrusion 37a is engaged with the distorting groove 18a, the supporting disc 37a2 is engaged with two edges of the distorting groove 18a, and another edge of the distorting groove 18a is engaged with the supporting column 37a3. When the supporting disc 37a2 and the supporting column 37a3 are engaged with the edges of the distorting groove 18a, the coincidence of a rotational axis X1 of the non-distorting protrusion 27a and a rotational axis X2 of the distorting groove 18a can be guaranteed, and thus stable transmission between the non-distorting protrusion 37a and the distorting groove 18a can be realized.

The projecting tooth 37a1 is engaged with any driving force transmission component 18b on the groove 18a, so that the rotating driving force on the groove 18a can be transmitted to the protrusion 37a, and thus the protrusion 37a can be driven to rotate along with the groove 27a.

The supporting disc 37a2 is circular. X3 refers to the circle center of the supporting disc 37a2, and the supporting column 37a3 and the projecting tooth 37a1 are symmetrically arranged relative to the center X3. Moreover, the distance from the vertex of the supporting column 37a3 to the supporting disc 37a2 is equal to that from the vertex of the projecting tooth 37a1 to the supporting disc 37a2 (i.e., the height is equal to each other), and the width of the supporting column 37a3 is equal to that of the projecting tooth 37a1.

As similar to the embodiment 1, the protrusion 37a can be conical, so that the protrusion 37a can be more easily interposed into the groove 18a during the operation.

As illustrated in FIG. 13b, the distorting groove 18a has a groove top surface 18a1 and a groove bottom surface 18a2. For the non-distorting protrusion 37a to be interposed into the bottom surface 18a2 of the groove 18a and be more easily engaged with the groove, the width of the projecting tooth 37a1, the supporting disc 37a2 and the supporting column 37a3 on the protrusion 37a must be set to be less than or equal to the width of an overlap area of the groove top surface 18a1 and the groove bottom surface 18a2.

Compared with the embodiment 1, the contact area of the supporting column 37a3 and the edge of the groove 18a is larger, so that the protrusion 37a can be more tightly engaged with the groove 18a, and thus more stable transmission can be realized.

The manufacturing process of the protrusion can be as follows: firstly, the circular supporting disc 37a2 is manufactured via tools such as a turning machine; and secondly, two key ways are symmetrically disposed on the disc and flat keys are correspondingly disposed into corresponding key ways to form the supporting column and the projecting tooth. In this way, the manufacturing process of the protrusion is simpler and the precision requirement can be more easily met.

Other constructional features or technical effects which are the same with those of the embodiment 1 (for example, the protrusion is set to be conical; the protrusion can be engaged with the grooves with different shapes) will not be repeated again.

Embodiment 5

Figure 14A:
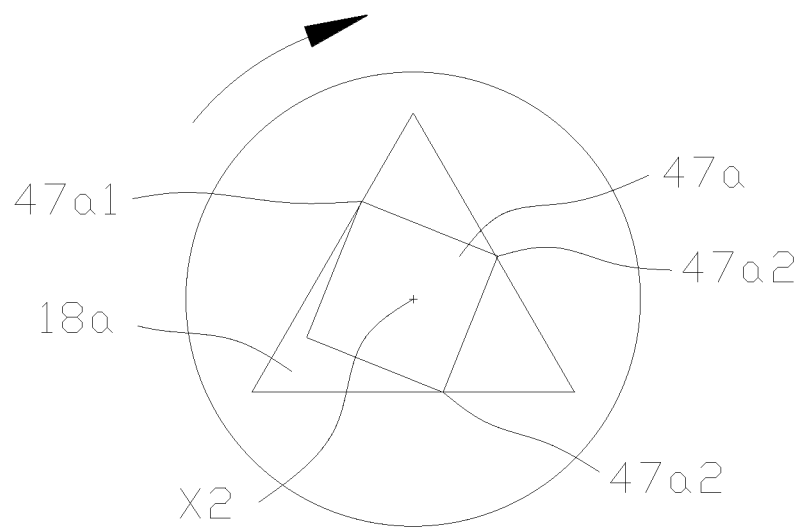
FIGS. 14a and 14b are cross-section diagrams respectively illustrating the state when a protrusion and a groove in the embodiment 5 and the embodiment 6 are engaged with each other in the case that the protrusion is a quadrangle and a pentagon.

FIG. 14a is the fifth embodiment of the invention. In the embodiment, a non-distorting protrusion is quadrilateral in shape. As illustrated in FIG. 14a, the non-distorting protrusion 47a is a quadrangle, with a regular quadrangle as an example in the embodiment. The regular quadrangle protrusion 47a has four vertexes, wherein two vertexes are engaged with two edges of a distorting groove 18a and are supporting vertexes 47a2; another vertex 47a1 is engaged with another edge of the groove 18a and is a stress vertex; and the two supporting vertexes 47a2 and the stress vertex 47a1 are respectively disposed on two sides of a rotational axis X2 of the distorting groove 18a respectively.

It is apparent to those skilled in the art that any of the four vertexes on the regular quadrangle protrusion 47a can be taken as the stress vertex 47a1 and any other two vertexes relative to the vertex can be taken as the supporting vertexes 47a2.

Embodiment 6

Figure 14B:
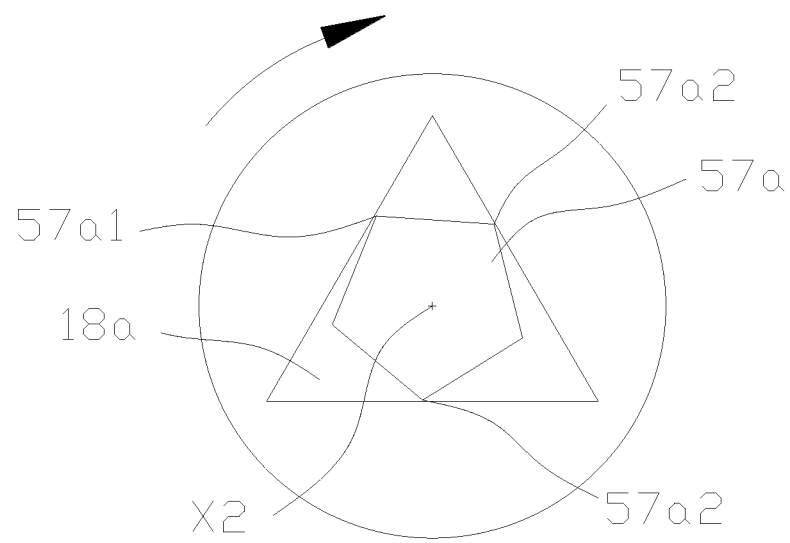

FIG. 14b is the sixth embodiment of the invention. In the embodiment, a non-distorting protrusion is pentagonal in shape. As illustrated in FIG. 14b, the non-distorting protrusion 57a is a pentagon, with a regular pentagon as an example in the embodiment. Two supporting vertexes 57a2 on the regular pentagon protrusion 57a are engaged with two edges of a groove 18a and have the function of supporting and positioning the protrusion 57a, and another stress vertex 57a1 is engaged with another edge of the groove 18a and receives the driving force from the groove 18a and transmits the driving force to the protrusion 57a.

It is apparent to those skilled in the art that any two vertexes of the pentagon can be taken as the supporting vertexes 57a2 and another vertex can be taken as the stress vertex 57a1.

Embodiment 7

Figure 15:
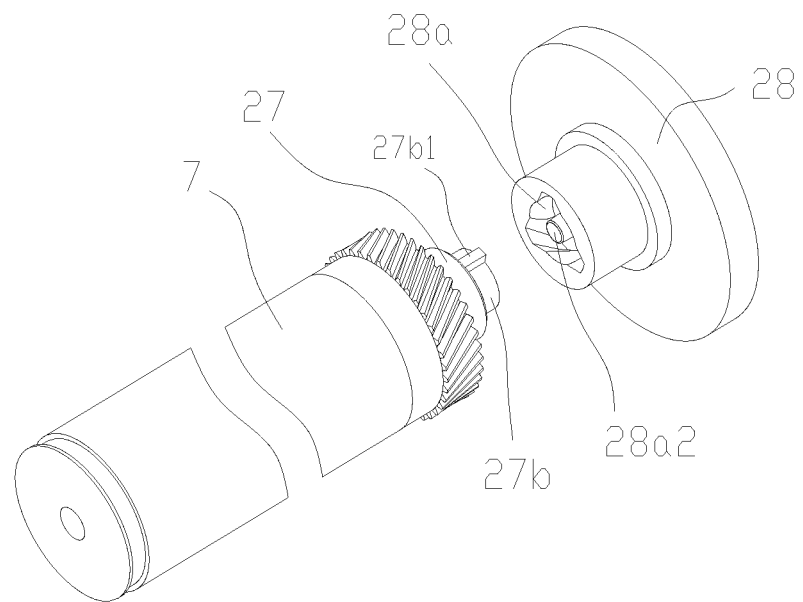
FIG. 15 is a stereogram illustrating the state before the engagement between a groove provided with a positioning column and a photosensitive drum driving member in the embodiment 7.
Figure 16:
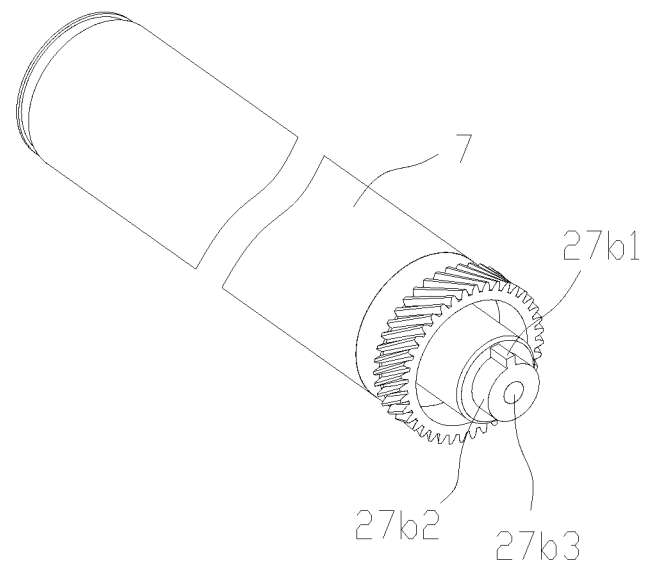
FIG. 16 is a stereogram of a photosensitive drum provided with a positioning hole in the embodiment 7.

As illustrated in FIGS. 15 and 16, a distorting groove 28a is disposed on an image forming apparatus driving member 28, and a supporting protrusion 28a2 is disposed in the middle of the distorting groove 28a and can be conical.

A photosensitive drum driving member is disposed at one end of a photosensitive drum 7 and comprises a drum shaft 27, wherein a non-distorting protrusion 27b is disposed on the drum shaft 27 and has a projecting tooth 27b1, a disc 27b2 and a supporting hole 27b3 of which the center is coincident with a rotational axis X1 of the photosensitive drum.

In the embodiment, the supporting protrusion 28a2 and the supporting hole 27b3 are taken as the position-limiting mechanism of the driving force transmission mechanism.

Figure 17A:
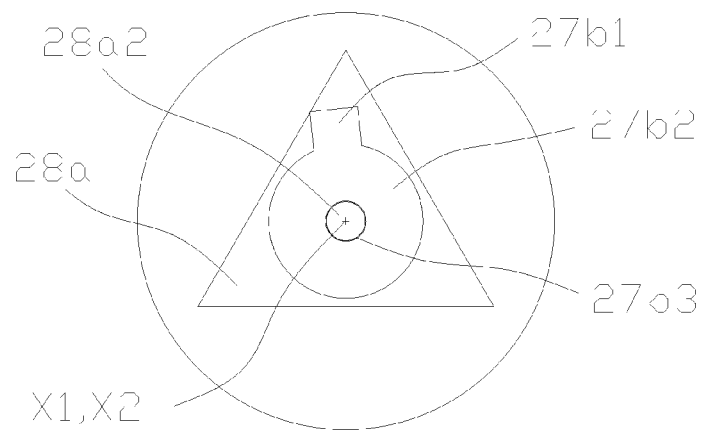
FIGS. 17a, 17b and 17c are cross-section diagrams illustrating the state when protrusions with three different shapes and provided with positioning holes are engaged with a groove provided with a positioning column, in the embodiment 7.

FIG. 17a is a cross-section diagram illustrating the state when the non-distorting protrusion 27b is engaged with the distorting groove 28a. When the non-distorting protrusion 27b is engaged with the distorting groove 28a, the supporting hole 27b3 is engaged with the supporting protrusion 28a2 and has the function of supporting and positioning the protrusion 27b, so that the rotational axis X1 of the non-distorting protrusion 27b can be coincident with a rotational axis X2 of the distorting groove 28a during the engagement between the protrusion 27b and the groove 28a, and thus stable engagement between the non-distorting protrusion 27b and the distorting groove 28a can be guaranteed. As illustrated in FIG. 17a, when the non-distorting protrusion 27b is engaged with the distorting groove 28a, the disc 27b2 is not engaged with edges of the groove 28a.

The projecting tooth 27b1 receives the rotation driving force from the groove 28a when being engaged with an edge of the groove, so that the protrusion 27b can be driven to rotate.

For the supporting protrusion 28a2 to be more conveniently interposed into the supporting disc 27b3, the supporting hole 27b3 can be conical, and the taper of the supporting hole 27b3 is basically the same with that of the supporting protrusion 28a2.

Other constructional features or technical effects which are the same with those of the embodiment 1 (for example, the protrusion is set to be conical; the protrusion can be engaged with the grooves with different shapes) will not be repeated again.

Figure 17B:
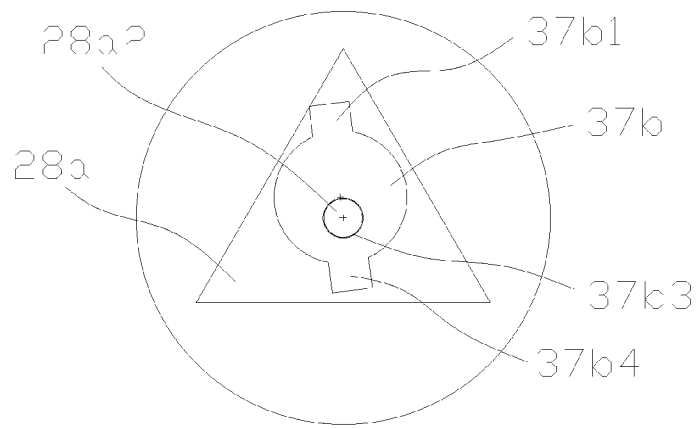
Figure 17C:
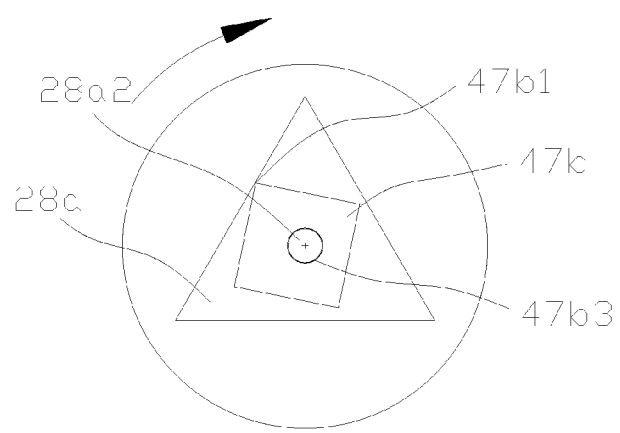

FIGS. 17b and 17c are respectively the second solution and the third solution of the embodiment. The difference of the two solutions with the above solution of the embodiment is as follows: the protrusion is varied in shape.

As illustrated in FIG. 17b, a symmetrical column 37b4 is disposed on a protrusion 37b, and a projecting tooth 37b1 and the symmetrical column 37b4 are disposed relative to a supporting hole 37b3 which is engaged with a supporting protrusion 28a2 on a groove 28a and has the function of supporting and positioning the protrusion 37b.

As illustrated in FIG. 17c, a protrusion 47b is a regular quadrangle, wherein one vertex of the regular quadrangle protrusion 47b is a stress vertex 47b1, and the protrusion also has a supporting hole 47b3 which is engaged with a supporting protrusion 28a2 on a groove and has the function of supporting and positioning the protrusion 47b. Of course, the protrusion can also be pentagonal and the like in shape.

Embodiment 8

An image forming apparatus driving member in the embodiment is the same with that in the embodiment 1 and will not be repeated again.

Figure 18:
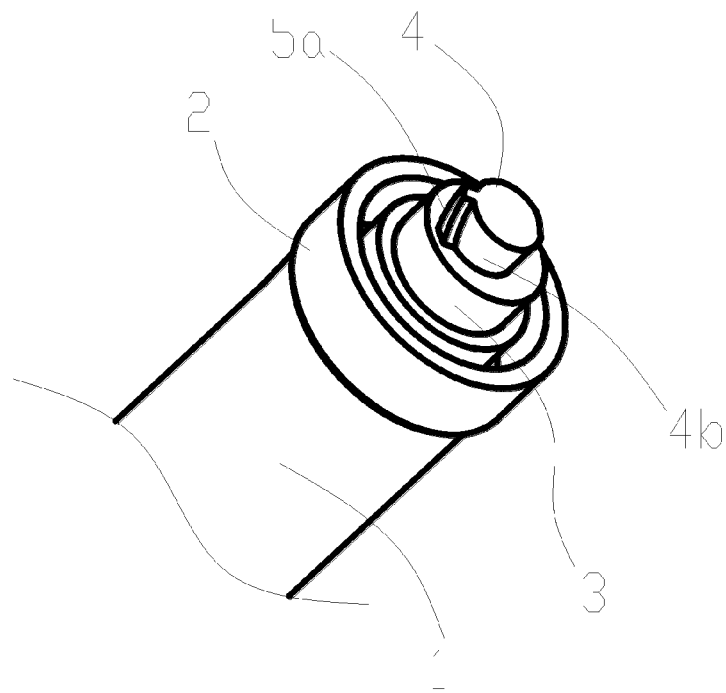
FIG. 18 is a stereogram of a photosensitive drum driving member in the embodiment 8.

FIG. 18 is a stereogram of a photosensitive drum driving member in the embodiment 8. As illustrated in the figure, the photosensitive drum driving member comprises a drum flange 2, a drum shaft 3 and a non-distorting protrusion 4, wherein the drum flange 2 is disposed on the end of a photosensitive drum 1, connected with the photosensitive drum 1, and used for transmitting the received driving force to the photosensitive drum 1; the drum shaft 3 is axially extended from the end portion of the drum flange 2 and used for rotationally supporting the photosensitive drum 1 during the operation of a process cartridge; the non-distorting protrusion 4 is axially extended from the end face of the drum shaft and used for receiving the driving force from the image forming apparatus driving member 18; and a supporting disc 4b is disposed on the non-distorting protrusion 4 and has a first projecting tooth 5a which is extended along the radial direction of the non-distorting protrusion 4 and obliquely disposed on the supporting disc 4b of the non-distorting protrusion 4.

In the embodiment, the first projecting tooth 5a and the supporting disc 4b are respectively taken as the stressed mechanism and the position-limiting mechanism of the driving force transmission mechanism.

During the driving force transmission, the first projecting tooth 5a on the non-distorting protrusion 4 of the photosensitive drum driving member is engaged with any driving force transmission component 18b to transmit the driving force; the supporting disc 4b of the non-distorting protrusion of the photosensitive drum driving member is tangent to and engaged with three edges of a groove of the image forming apparatus driving member at three tangent points P1, P2 and P3, so that the centering of the photosensitive drum driving member and the image forming apparatus driving member 18 during the driving force transmission can be realized.

Figure 19:
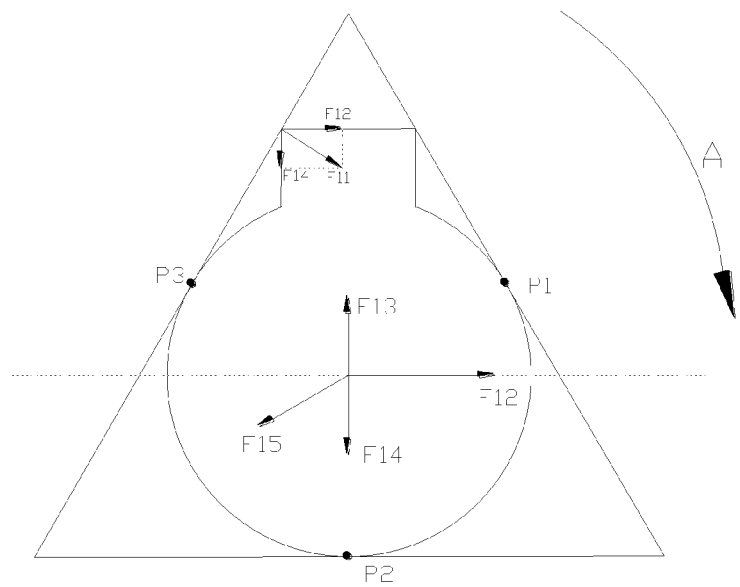
FIG. 19 is a force diagram illustrating the assembly of the photosensitive drum driving member and an image forming apparatus driving member in the embodiment 8.

FIG. 19 is a force diagram illustrating the assembly of the photosensitive drum driving member and the image forming apparatus driving member. In the figure, "A" refers to the rotation direction of the image forming apparatus driving member; F11 refers to the force applied to the first projecting tooth 5a by the image forming apparatus driving member and is resolved into a normal force F12 and a radial force F14; F15 refers to the force generated by the image forming apparatus driving member at the tangent point P1; F13 refers to the force generated by the image forming apparatus driving member at the tangent point P2; and no force is applied to P3. In summary, the following force formula is obtained:

$$\begin{cases} F13 = F14 + F15 \cdot \sin 30° \\ F12 = F15 \cdot \sin 60° \\ F12 = \sqrt{3} \cdot F14, \end{cases}$$

with the results as follows: F13=2·F14 and $$F15 = \frac{2\sqrt{3}}{3} F12.$$

That is to say, the force $$\frac{2\sqrt{3}}{3} F12$$

is applied to the image forming apparatus driving member or the photosensitive drum driving member at P1, and the force 2·F14 is applied to the image forming apparatus driving member or the photosensitive drum driving member at P2.

The photosensitive drum driving member and the image forming apparatus driving member are mutually worn during the engagement and the driving force transmission. Therefore, in the solution, the photosensitive drum driving member is taken as the projecting tooth of the driving force transmission component and disposed at different positions with the supporting disc of the non-distorting protrusion, having the function of positioning, so that the driving force transmission function and the positioning function cannot be affected by each other due to wear.

Embodiment 9

Figure 20:
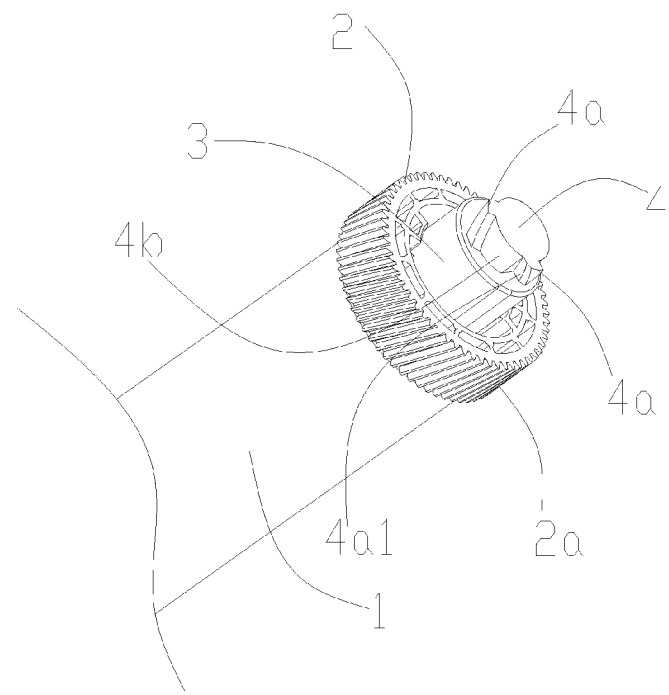
FIG. 20 is a stereogram of a photosensitive drum driving member in the embodiment 9.
Figure 21:
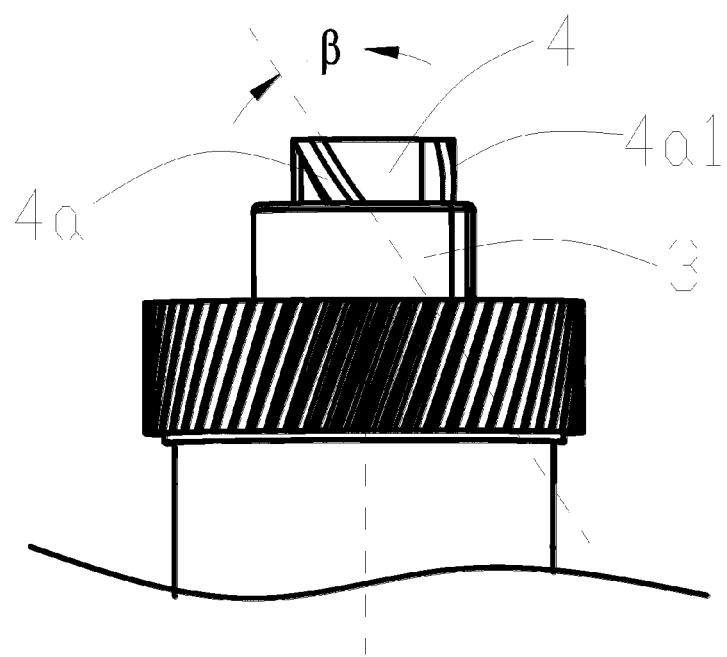
FIG. 21 is a front view of the photosensitive drum driving member in the embodiment 9.
Figure 22:
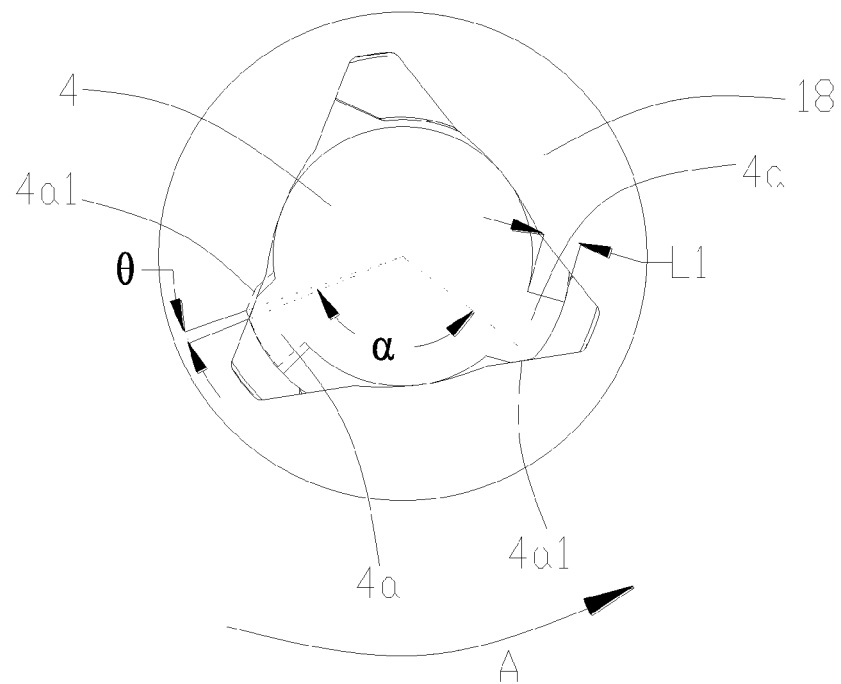
FIG. 22 is a top view illustrating the assembly of the photosensitive drum driving member and an image forming apparatus driving member in the embodiment 9.

FIGS. 20 and 21 are respectively a stereogram and a front view of a photosensitive drum driving member in the embodiment, and FIG. 22 is a top view illustrating the assembly of the photosensitive drum driving member and an image forming apparatus driving member in the embodiment. The image forming apparatus driving member as illustrated in the embodiment adopts the image forming apparatus driving member as illustrated in the embodiment 1 and will not be repeated again. As illustrated in the figures, the photosensitive drum driving member comprises a drum flange 2, a drum shaft 3 and a cylindrical non-distorting protrusion 4, wherein the drum flange 2 is fixedly connected to the end of a photosensitive drum 1; the drum shaft 3 is axially extended from the end portion of the drum flange 2 and used for rotationally supporting the photosensitive drum 1 during the operation of a process cartridge; the cylindrical non-distorting protrusion 4 is axially extended from the end face of the drum shaft 3 and used for receiving the driving force from the image forming apparatus driving member 18; and a pair of projecting teeth 4a which are extended along the radial direction of the non-distorting protrusion 4 and respectively engaged with any two driving force transmission portion in the image forming apparatus driving member are disposed on a supporting disc 4b of the non-distorting protrusion 4. Moreover, the projecting teeth 4a are obliquely disposed on the supporting disc 4b of the non-distorting protrusion 4. In the embodiment, the projecting teeth 4a and the supporting disc are respectively taken as the stressed mechanism and the position-limiting mechanism of the driving force transmission mechanism. The standard angle of the minimum included angle alpha between the two projecting teeth 4a is 120°, with the angle upper limit tolerance to be within 2° generally. The manufacturing precision error theta is allowable as for the projecting teeth 4a in the solution and is 2°-10° and preferably 2°-4°. If theta refers to the angle error, the minimum included angle alpha between the two projecting teeth 4a is alpha+theta. Herein, the two projecting teeth 4a may not be engaged with the driving force transmission portion 18b of a groove 18a, and the projecting tooth disposed on the upstream end of the rotation direction is the first to be engaged with the driving force transmission component on the image forming apparatus driving member and has the function of buffering. If the projecting tooth 4a has the manufacturing error theta along the downstream of the rotation direction, the projecting tooth can have a graded mating surface due to theta, which has the function of buffering during the engagement between the projecting tooth 4a and the driving force transmission component 18b of the groove, so that the damage between the image forming apparatus driving member and the photosensitive drum driving member can be reduced. Cylindrical surfaces, between the two projecting teeth 4a, of the non-distorting protrusion make contact with edges of the image forming apparatus driving member, so that the positioning of the photosensitive drum driving member can be realized. Moreover, fillets are also disposed at connecting positions of the projecting teeth 4a and the cylindrical surfaces of the non-distorting protrusion, so that the stress concentration can be reduced. Moreover, the drum flange 3, the drum shaft 3, the cylindrical non-distorting protrusion 4 and the projecting teeth 4a in the photosensitive drum driving member can be integrally molded by the same materials and can also have buffer structures. In addition, a drum gear 2a used for transmitting the driving force to other elements (such as a developing element) can also be disposed on the drum flange 2.

Figure 23:
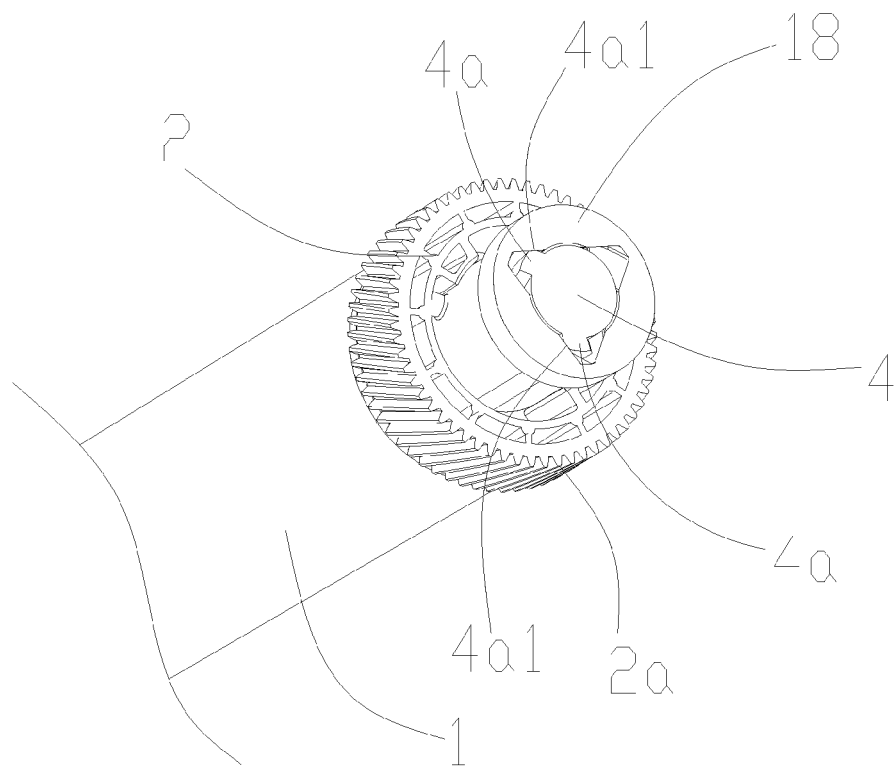
FIG. 23 is an assembly diagram of the photosensitive drum driving member and the image forming apparatus driving member in the embodiment 9.
Figure 24:
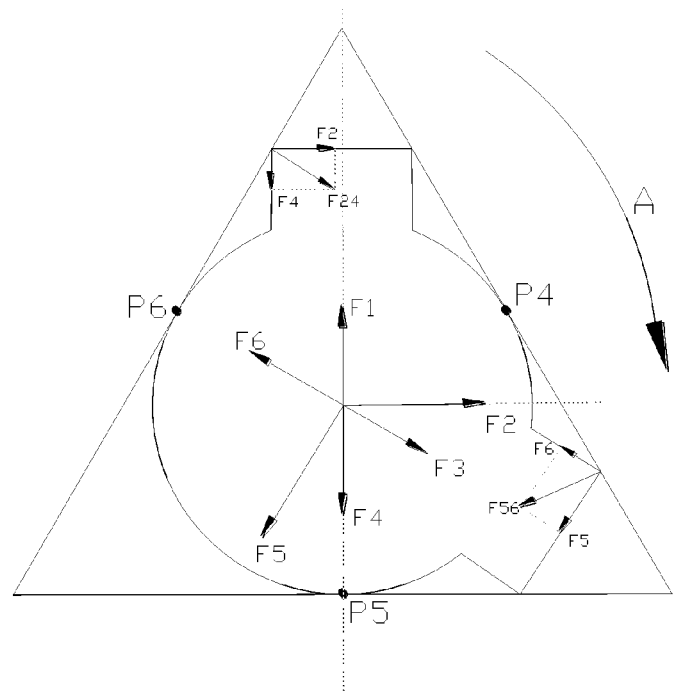
FIG. 24 is a cross-section force diagram illustrating the state after the engagement between the image forming apparatus driving member and the photosensitive drum driving member in the embodiment 9.

FIG. 23 is an assembly diagram of the photosensitive drum driving member and the image forming apparatus driving member, and FIG. 24 is a cross-section force diagram illustrating the state after the engagement between the image forming apparatus driving member and the photosensitive drum driving member. As illustrated in the figures, the photosensitive drum driving member is tangent to and engaged with the edges of the groove of the image forming apparatus driving member at three tangent points P4, P5 and P6; "A" refers to the rotation direction of the image forming apparatus driving member; and the force F24 and the force F56 which are the same with each other are applied to the photosensitive drum driving member by the image forming apparatus driving member. In the case that the torsional moment of the photosensitive drum driving member is twice that of the embodiment 8, F24 and F56 are the same with F11 in the embodiment 8; F24 is resolved into a normal force F2 and a radial force F4; F56 is resolved into a normal force F5 and a radial force F6; F2 and F5 are the same with F12 in the embodiment 8; and F4 and F6 are the same with F14 in the embodiment 8. Supposing that F1 refers to the force generated by the image forming apparatus driving member at the tangent point P5, F3 refers to the force generated by the image forming apparatus driving member at the tangent point P6, and no force is applied to P4, in summary, the following force formula can be obtained:

$$\begin{cases} F1 + F6 \cdot \sin30° = F4 + F5 \cdot \sin60° + F3 \cdot \sin30° \\ F2 + F3 \cdot \sin60° = F6 \cdot \sin60° + F5 \cdot \sin30° \\ F2 = F5 = \sqrt{3}\,F4 = \sqrt{3}\,F6, \end{cases}$$

with the results as follows: F1=2·F4 and F3=0. That is to say, the force 2·F4 is applied to the image forming apparatus driving member and the photosensitive drum driving member at P5, no force is applied to P6. Compared with the embodiment 8, the number of stress points in the solution is reduced, so that the wear of the image forming apparatus driving member and the photosensitive drum driving member at the tangent points P5 and P6 can be reduced, and thus the positioning stability of the photosensitive drum driving member can be improved, and consequently, more stable driving force transmission can be realized.

Embodiment 10

Figure 25:
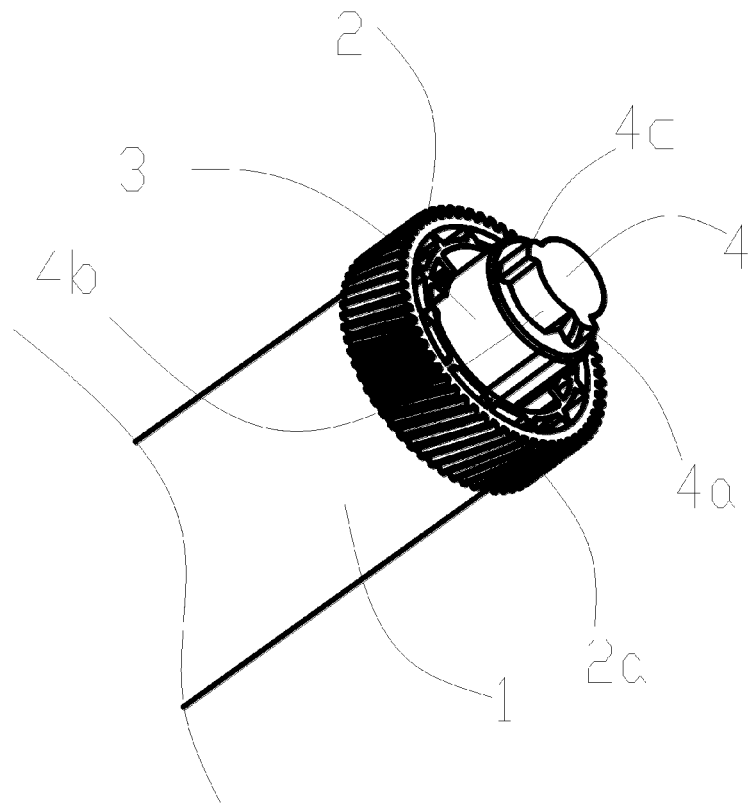
FIG. 25 is a stereogram of a photosensitive drum driving member in the embodiment 10.

It is apparent to those skilled in the art that one projecting tooth of the two projecting teeth is set to be a oblique tooth and the other projecting tooth is set to be a straight tooth, with the same technical effect achieved as well. FIG. 25 is a stereogram of a photosensitive drum driving member in the embodiment. As illustrated in the figure, the oblique tooth 4a is obliquely disposed on a supporting disc 4b of a non-distorting protrusion, and the straight tooth 4c is vertically disposed on the supporting disc 4b.

Embodiment 11

Figure 26:
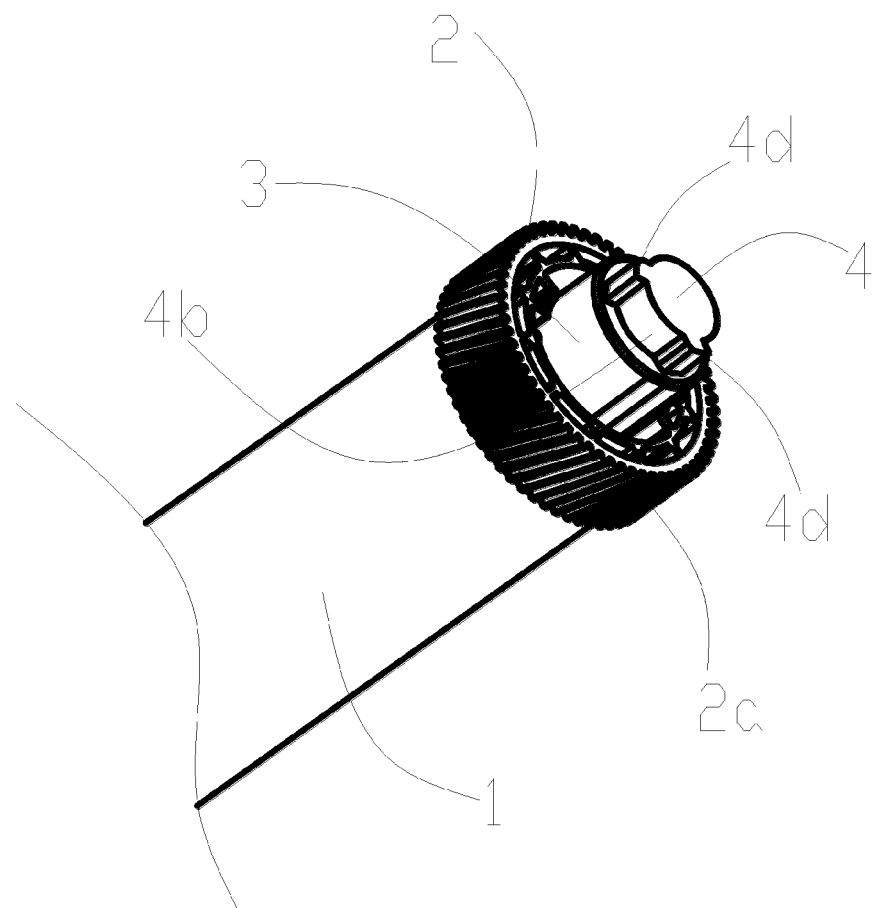
FIG. 26 is a stereogram of a photosensitive drum driving member in the embodiment 11.

When the rotating speed of an image forming apparatus is lower, the torque of an image forming apparatus driving member is smaller, and two projecting teeth of a photosensitive drum driving member can be both set to be straight teeth. FIG. 26 is a stereogram of the photosensitive drum driving member in the embodiment, wherein 4d refers to the projecting teeth of the photosensitive drum driving member. Therefore, the manufacturing precision of the photosensitive drum driving member can be further reduced.

In the invention, as for the projecting tooth (projecting teeth) as illustrated in the embodiments 8 to 11, with the embodiment 9 as an example: as illustrated in FIGS. 21 and 22, the included angle beta between the projecting teeth 4*a* and the rotation axis of the photosensitive drum driving member is 3°-40° and preferably 25°-30°, so that the phenomenon that the photosensitive drum driving member is disengaged from the image forming apparatus driving member during the driving force transmission can be avoided when smooth engagement between the photosensitive drum driving member and the image forming apparatus driving member can be guaranteed, and thus stable driving force transmission between the image forming apparatus driving member and the photosensitive drum driving member can be realized. Moreover, L1 refers to the length of the projecting teeth 4*a* beginning from the supporting disc 4*b* along the radial direction and is 2-5 mm and preferably 2.3-3.3 mm, so that the photosensitive drum driving member can be guaranteed to have enough force moment for driving force transmission.

Figure 27:
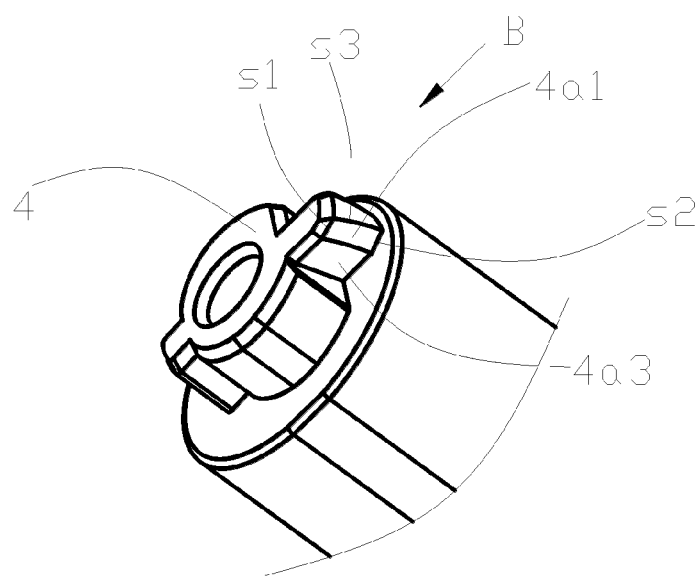
FIG. 27 is a partial enlarged drawing of a non-distorting protrusion provided with mating surfaces of the invention.
Figure 28:
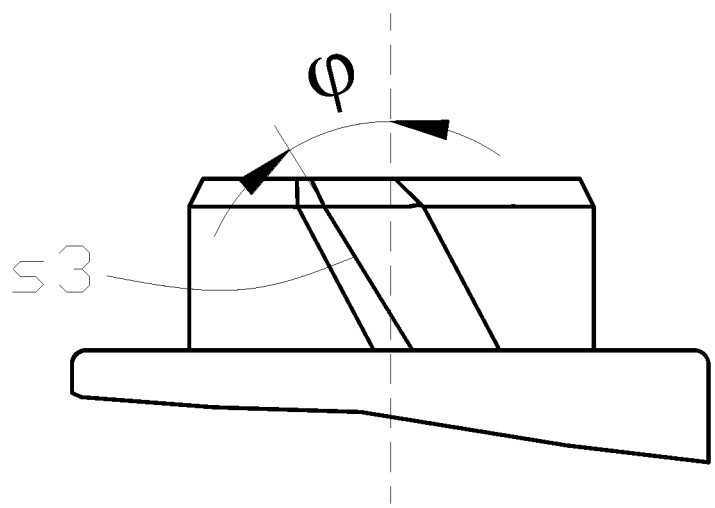
FIG. 28 is a front view of FIG. 26 along the "B"
Figure 29:
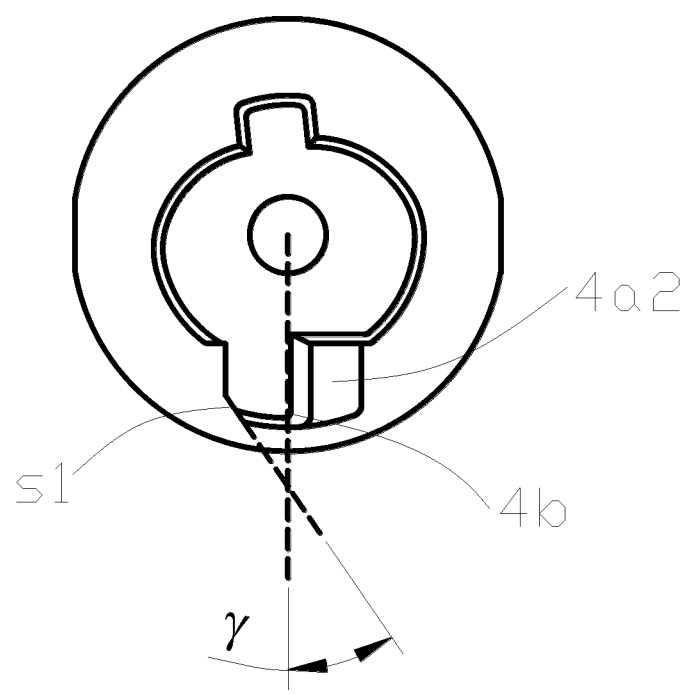
FIG. 29 is a top view of the non-distorting protrusion provided with the mating surfaces of the invention.

In the invention, as for the projecting tooth (projecting teeth) in the above embodiments, with the embodiment 9 as an example: as illustrated in FIGS. 21, 22 and 27, the projecting teeth 4*a* also have mating surfaces 4*a*1 of which the area is 5-20 mm$^2$ and preferably 7-16 mm$^2$. During the driving force transmission, the mating surfaces 4*a*1 are engaged with inner walls of the driving force transmission portion in the image forming apparatus driving member to transmit the driving force. As the mating surfaces 4*a*1 are disposed on the projecting teeth 4*a*, the wear between the photosensitive drum driving member and the image forming apparatus driving member can be reduced. Moreover, each projecting tooth also have a vertex angle 4*a*2 and two parallel planes 4*a*3 which are connected with the supporting discs of the projecting teeth, wherein Beta refers to the included angle between the planes 4*a*2 and 4*a*3 and the photosensitive drum axis. Furthermore, each mating surface also has straight edges s1 and s2 and a bevel edge s3, wherein the straight edges s1 and s2 are parallel to each other; the included angle phi between the bevel edge s3 and the photosensitive drum axis is 5°-50° and preferably 10°-40°; and the included angle gamma between the straight edge s1 and a connecting line from the center of the photosensitive drum driving member to the vertex angle 4*a*2 of the projecting tooth is 0°-90° and preferably 25°-45°. As illustrated in FIGS. 27 to 29, the "B" direction as illustrated in FIG. 27 is parallel to the radial extension direction of the projecting teeth.

It is apparent to those skilled in the art that three symmetrical projecting teeth can be also set and are all oblique projecting teeth or all vertical projecting teeth. Or else, one is set to be an oblique projecting tooth and the other two are set to be vertical projecting teeth, or one is set to be a vertical projecting tooth and the other two are set to be oblique projecting teeth, and the same technical effect can be achieved as well. The oblique projecting tooth refers to that the projecting tooth is obliquely disposed on the supporting disc of the non-distorting protrusion, and the vertical projecting tooth refers to that the projecting tooth is vertically disposed on the supporting disc of the non-distorting protrusion.

It is apparent to those skilled in the art that the supporting disc of the non-distorting protrusion and a cylindrical surface of the non-distorting protrusion are the same component.

The invention relates to a process cartridge, which comprises a photosensitive drum and also comprises the driving force transmission mechanism according to any one of the embodiments, wherein the driving force transmission mechanism is disposed on the end of the photosensitive drum.

What is claimed is:

1. A driving force transmission mechanism, comprising a photosensitive drum driving member, wherein the photosensitive drum driving member engaged with an image forming apparatus driving member to transmit the driving force;
the image forming apparatus comprising:
a triangular groove having a triangular cross-section and driving force transmission portion disposed in three vertex angles of the triangular groove;
the photosensitive drum driving member comprising a non-distorting protrusion axially extended from the end face of a drum shaft and engaged with the groove on the image forming apparatus driving member;
the protrusion having a position-limiting mechanism and a stressed mechanism;
wherein the position-limiting mechanism and the stressed mechanism are disposed at different positions;
and wherein a projecting tooth obliquely disposed on the non-distorting protrusion is taken as the stressed mechanism;
and the projecting tooth also having a mating surface engaged with the driving force transmission portion to transmit the driving force;
wherein a supporting disc and two protruding columns are disposed on the protrusion; the protruding columns are symmetrically distributed on both sides of the protrusion; a first protruding column is a projecting tooth engaged with the driving force transmission component; a second protruding column makes contact with an inner wall of the groove; the first protruding column is taken as the stressed mechanism; and the position-limiting mechanism comprises the supporting disc and the second protruding column.

2. A process cartridge, comprising a photosensitive drum, wherein the process cartridge also comprising the driving force transmission mechanism according to claim 1;
and the driving force transmission mechanism disposed on the end of the photosensitive drum.

* * * * *